(12) United States Patent
Veligdan

(10) Patent No.: US 6,597,417 B1
(45) Date of Patent: Jul. 22, 2003

(54) OPTICAL PANEL HAVING BLACK MATERIAL BETWEEN APEXES OF SERRATIONS ON THE INLET FACE

(75) Inventor: James T. Veligdan, Manorville, NY (US)

(73) Assignee: Scram Technologies, Inc., Dunkirk, MD (US)

(*) Notice: Subject to any disclaimer, the term of this patent is extended or adjusted under 35 U.S.C. 154(b) by 155 days.

(21) Appl. No.: 09/624,959

(22) Filed: Jul. 25, 2000

(51) Int. Cl.[7] .................. G02F 1/1335; G02F 1/1333; G02B 27/00; G02B 5/04
(52) U.S. Cl. .............. 349/95; 349/5; 349/57; 349/110; 359/614; 359/831
(58) Field of Search .................. 349/5, 57, 95, 349/110, 112; 359/613, 614, 831, 833, 837, 346, 443, 453, 460; 385/146, 901

(56) References Cited

U.S. PATENT DOCUMENTS

| | | | |
|---|---|---|---|
| 3,004,470 A | | 10/1961 | Ruhle ................. 350/437 |
| 4,729,631 A | * | 3/1988 | Takahashi et al. .......... 359/456 |
| 5,040,878 A | * | 8/1991 | Eichenlaub ................. 349/62 |
| 5,206,746 A | * | 4/1993 | Ooi et al. ............... 349/57 |
| 5,420,761 A | | 5/1995 | DuNah et al. ........... 353/74 |
| 5,543,870 A | | 8/1996 | Blanchard ............... 353/74 |
| 5,594,561 A | | 1/1997 | Blanchard ................. 349/59 |
| 5,615,045 A | * | 3/1997 | Takuma et al. ............ 359/443 |
| 5,751,387 A | | 5/1998 | Iigahama et al. .......... 349/95 |
| 5,838,504 A | * | 11/1998 | Ichikawa et al. ........... 359/431 |
| 5,911,616 A | * | 6/1999 | Levine et al. .............. 445/24 |
| 6,211,932 B1 | | 4/2001 | Iigahama et al. ........... 349/95 |
| 6,389,206 B1 | * | 5/2002 | Veligdan .................. 385/115 |

FOREIGN PATENT DOCUMENTS

JP 06-148620 * 5/1994
JP 09-090059 * 4/1997

OTHER PUBLICATIONS

Dai Nippon Corp, "dnp Black Stripe Screen", internet article Mar. 2000 <http://www.dnp.dk/siab.asp?o_id=281>, three pages.
3M, "3M Transmissive Right Angle Film (TRAF) ll", product literature, 2 pages, 1996.

* cited by examiner

Primary Examiner—Tarifur R. Chowdhury
(74) Attorney, Agent, or Firm—Reed Smith LLP; William J. McNichol, Jr.; Matthew J. Esserman

(57) ABSTRACT

An optical panel includes a transparent serrated first side, and an opposite second side, and a black material provided on the serrated first side for intermittently blocking or absorbing light transmission. Image light may be transmitted through the panel at the serrations, with contrast provided by the black material.

49 Claims, 4 Drawing Sheets

OPTICAL PANEL HAVING BLACK MATERIAL BETWEEN APEXES OF SERRATIONS ON THE INLET FACE

BACKGROUND OF THE INVENTION

The present invention relates generally to optical display panels, and particularly, to optical display panels comprising an element for directing image light through a display screen. More specifically, the present invention relates to thin optical display panels comprising an element for directing image light through a display screen, which element is capable of enhancing contrast of the image when viewing the display screen.

Optical display screens are found in many common applications such as television, computers, and industrial and scientific equipment. Common display screens form images using a cathode ray tube (CRT) which is relatively long and requires a large enclosure.

Thin display screens of various forms are continually being developed for replacing CRTs for minimizing the screen envelope and overall weight. A common thin panel uses a liquid crystal display (LCD) for spatially modulating light therethrough for creating two-dimensional video images.

Image quality is based on resolution, brightness, contrast, and viewing angle, for example, which characteristics vary in performance according to the particular display screen configuration.

For example, rear projection, large screen television (TV) displays fail to achieve levels of brightness, contrast, resolution, and wide viewing angle of common CRT displays, due in part to the use of lenticular screens.

Similarly, common LCD displays also fail to match performance of typical CRT displays.

Another type of thin panel display includes thin optical waveguides laminated together in a thin wedge shape through which image light is internally reflected between a narrow inlet face and a large outlet screen. U.S. Pat. No. 5,381,502 describes an exemplary optical panel based on this technology being developed for improving performance of thin panel displays.

All of the above-identified types of display screens have inherently limited contrast capabilities. Contrast in a display screen is based on the apparent blackness of the unlighted screen itself. Images are produced by varying the amount of light in individual picture elements, or pixels, for both black and white and color images, with image blackness being provided when no image light is generated.

The various screens described above cannot themselves be totally black since no image light could be projected therethrough. Accordingly, a typical CRT screen includes an aperture mask which itself is generally black, and has apertures through which the image light is projected. The image thus perceived from such a screen appears black in those regions not illuminated by image light.

LCD displays modulate plain light at corresponding pixels which are either opaque or translucent for creating a video image, and cannot be black. Contrast therefrom is therefore limited.

And, the optical waveguide displays require transparent waveguides for channeling the light image, and contrast may be created by providing black cladding between the waveguides for enhancing contrast as described in U.S. Pat. No. 5,625,736.

In view of these inherent contrast limitations in typical thin panel display screens, it is desired to provide a thin panel display having high contrast in a relatively simple configuration for minimizing thickness and costs of production.

BRIEF SUMMARY OF THE INVENTION

An optical panel includes a serrated first side, an opposite second side, and a black material provided therewith for intermittently blocking light transmission. Image light may be transmitted through the panel at portions of the serrations that are not provided with the black material, with contrast provided by the black material.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
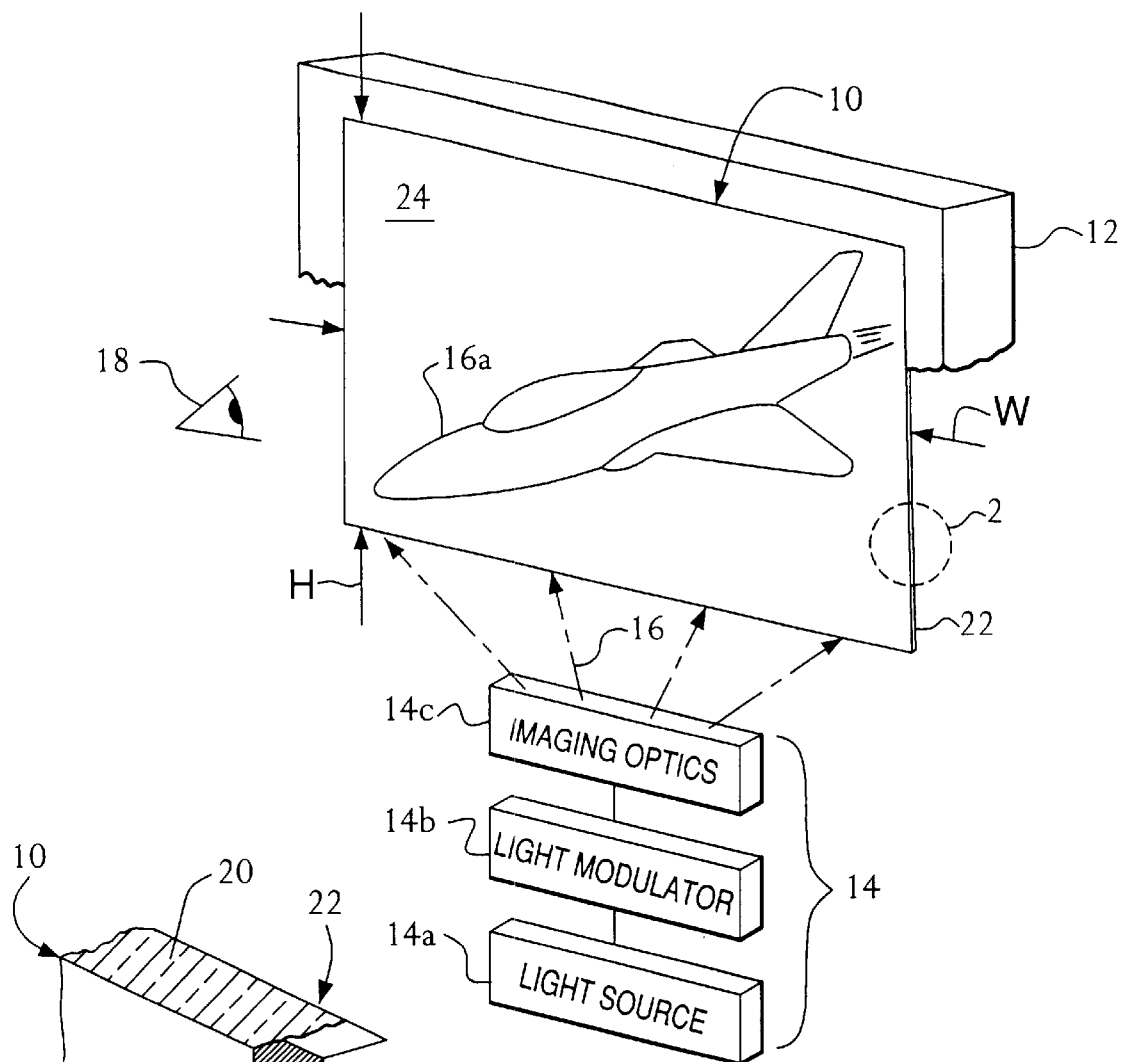
FIG. 1 is a schematic view of an optical display panel in accordance with an exemplary embodiment of the present invention.

Illustrated in FIG. 1 is an optical display panel 10 in accordance with an exemplary embodiment of the present invention. The panel may be sized in horizontal width W and vertical height H for any desired application, such as the exemplary large panel video display screen illustrated.

The optical panel may be suitably mounted in a cabinet or enclosure 12, shown in part, for mounting therein all working components thereof. For example, the optical panel is illustrated in combination with a projector 14 suitably configured for projecting image light 16 through the panel for producing a video image 16a for direct viewing by an observer 18 facing the panel.

The projector 14 may take any conventional form capable of projecting a viewable image. For example, the image light 16 is initially generated as plain, unmodulated light in a suitable light source 14a, which may be a bright incandescent bulb, or laser, or any other suitable source. The plain light is then spatially and temporally modulated in a modulator 14b for defining individual picture elements, or pixels, which define the desired two-dimension video image or pattern. The modulator may take any conventional form such as a liquid crystal display (LCD) or a Digital Micromirror Device (DMD).

The LCD is a light transmissive device having portions which are selectively rendered opaque for selectively interrupting the light at selected pixels. The DMD has individual micromirrors which are selectively tiltable to reflect the light toward the panel or away therefrom for defining corresponding pixels.

Suitable imaging optics 14c, which may include folding mirrors and lenses, are optically aligned between the panel and the light modulator for horizontally and vertically scaling and focusing the image light as required over the back side of the panel for transmission therethrough. In a typical example, the image light is scaled up in size with horizontal and vertical expansion from the small modulator 14b to the larger inlet side of the panel 10.

Figure 2:
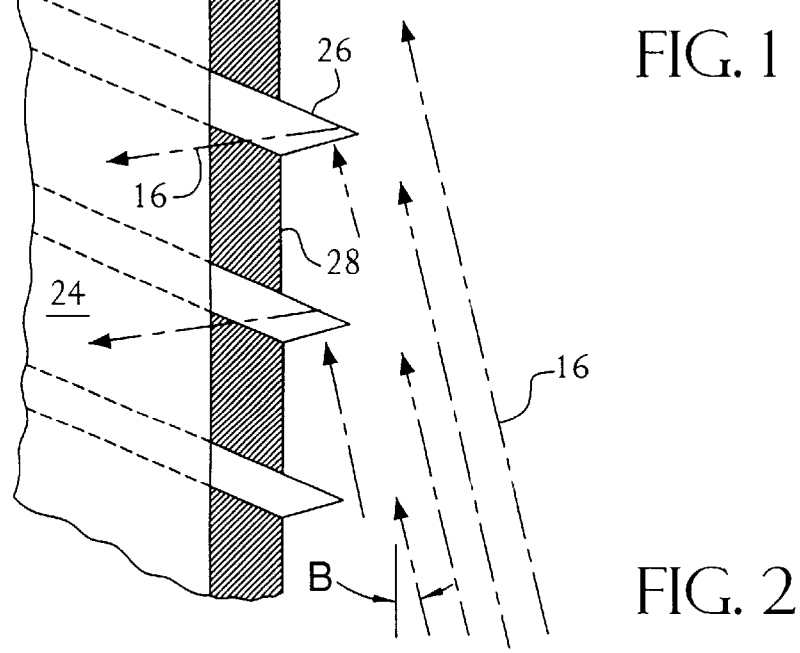
FIG. 2 is an enlarged sectional view of the panel illustrated in FIG. 1 and taken within the circle labeled 2.
Figure 3:
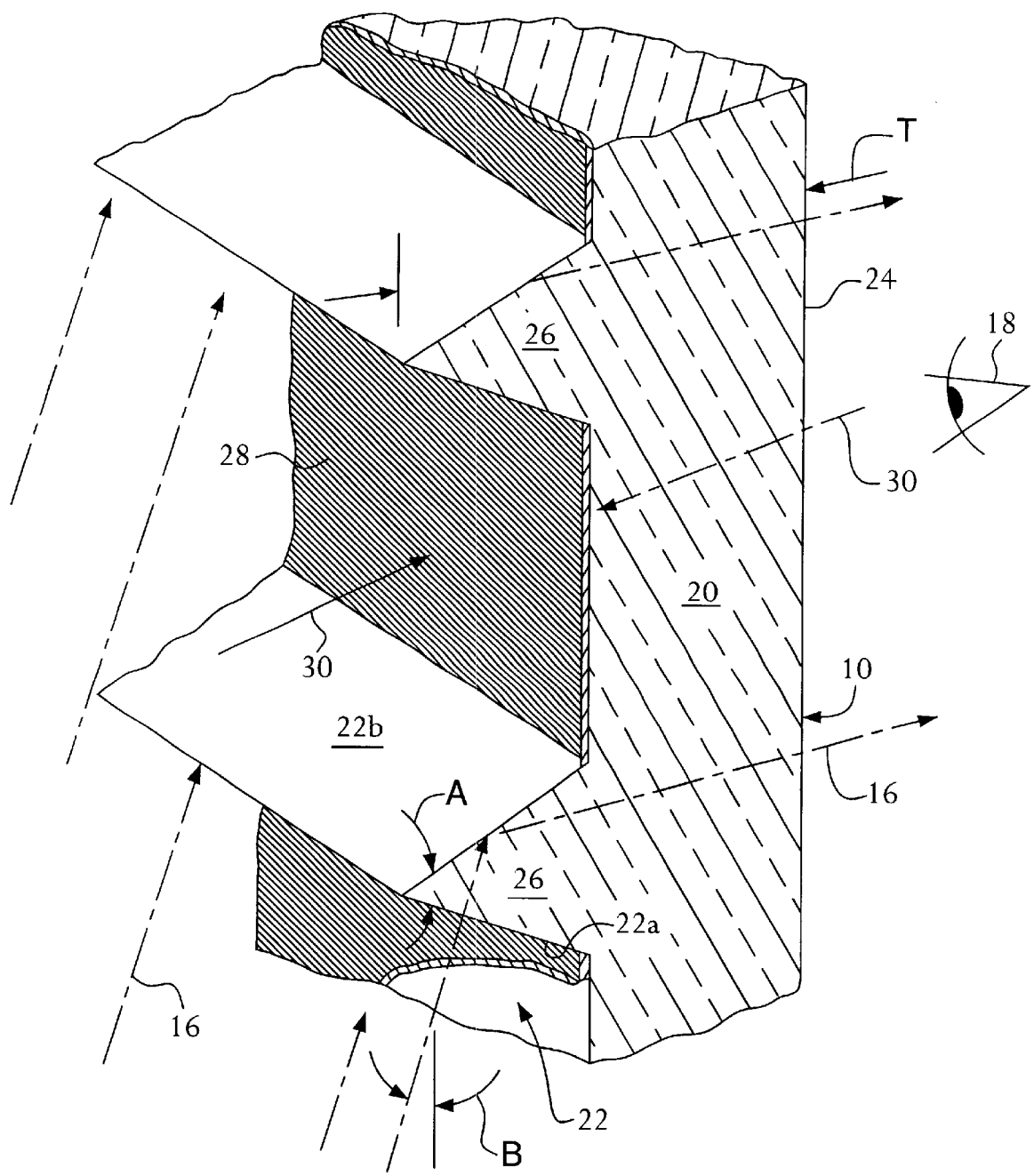
FIG. 3 is an enlarged backside view of a portion of the panel illustrated in FIG. 2 showing serrations thereon and a black material therebetween in accordance with an exemplary embodiment of the present invention.

Enlarged portions of the panel 10 are illustrated in more particularity in FIGS. 2 and 3. The panel 10 is preferably in the form of an optically transparent body or film 20 which may have any suitable material composition such as glass or plastic, with an exemplary index of refraction of about 1.56 for plastic.

The panel in sheet form has a serrated first side 22 which defines an inlet face, and an opposite second side 24 which defines an outlet screen.

The inlet face 22 includes a multitude of optically transparent serrations 26 for receiving the image light 16 from the projector. The serrations are integrally formed with the body film 20 in a unitary optically transmissive member for transmitting the image light through the film by total internal reflection therein for display at the screen 24. The screen 24 may be suitably frosted for diffusing the image light 16 in producing the image viewable by the observer. Or, a separate light diffusing member or sheet (not shown) may be laminated against the screen 24 for diffusing the image light for increasing the field of view.

In the exemplary embodiment illustrated in FIG. 3, the panel first and second sides 22,24 are directly opposite to each other for minimizing the overall thickness of the panel. Each of the serrations 26 is in the preferred form of a triangular prism having a transparent first facet 22a which first receives the image light 16 and channels the light through the facet and inside the serration. Each serration also includes an opposite second facet 22b which is preferably also transparent and intersects the first facet at a corresponding apex having an acute included prism or apex angle A therebetween. The optical panel has a thickness T measured from the apexes of the several prism serrations and the opposite second side screen 24.

The first facets 22a face the incident image light 16 for channeling the light inside each serration wherein it is internally reflected off the inside surface of the corresponding second facets 22b with total internal reflection. The second facets 22b are transparent and exposed to ambient air which has an index of refraction of 1.0. Since the index of refraction outside the second facets 22b is less than the refractive index of the serrations themselves, total internal reflection of the image light is obtained with correspondingly high light transmission efficiency. The image light thusly enters the optical panel through the several first facets 22a and is internally reflected off the inside surfaces of the corresponding second facets 22b and redirected through the body film substantially perpendicularly outwardly from the screen 24 toward the observer.

Alternatively, the second facets 22b may optionally include a mirror coating on the outside surfaces for obtaining specular reflection inside the serrations, but specular reflection is less efficient than total internal reflection.

The ability of the serrations 26 to bend or turn the incident image light 16 permits the optical panel to be manufactured extremely thin. As initially shown in FIG. 1, the image light 16 may be projected over the back, inlet side 22 of the panel either from below as illustrated, or from above if desired. The optical panel may be extremely thin by minimizing the angle of incidence of the image light 16 over the inlet face and using the serrations for bending or turning the image light for projection substantially perpendicularly outwardly from the screen 24.

In FIG. 3, the image light 16 is shown as projecting upwardly at an angle of incidence B relative to the vertical axis of the optical panel. The incidence angle B has an acute value as little as about zero degrees and up to about 20 degrees, or higher as desired. The smaller the incidence angle, however, the thinner the overall depth of the panel and mounted projector will be. The thickness T of the optical panel itself may be as little as about 6 mils for suitable light redirecting capability, but may be suitably thicker for increasing its structural rigidity if desired. The optical panel may be self supporting in the cabinet, if desired, or may be otherwise rigidly mounted around its perimeter, or opposite sides.

Since the body film 20, including the integral serrations 26, is optically transparent, it has little, if any inherent contrast capability for the resulting display image. The film itself is thusly highly efficient at turning and transmitting the image light with high brightness, yet image contrast is severely limited, and is obtained only by varying intensity of the image light.

Accordingly, and in accordance with an embodiment of the present invention, the optical panel 10 illustrated in FIGS. 2 and 3, for example, also includes a black material or barrier 28 disposed between the individual serrations 26 for locally blocking light transmission thereat. The black material 28 may be disposed on either side of the panel, but in the preferred embodiment illustrated in FIG. 3 is disposed on the first side 22 in register or alignment between the serrations for absorbing light therebetween while permitting light transmission through the serrations themselves.

By spatially intermittently positioning the black barrier between the serrations, a considerable portion of the overall surface area of the panel may be black, with the image light still being transmissive through the corresponding serrations. In this way, the simple optical panel can transmit image light with high brightness and efficiency, and also with high contrast due to the black material.

As shown in FIG. 3, the exemplary form of the black barrier 28 is preferably optically aligned between opposing first and second facets 22a,b of adjoining serrations 26 for locally blocking light transmission therebetween. The black barrier 28 not only blocks light, but is also effective for locally absorbing light between adjacent serrations.

As shown in FIG. 3, any stray or ambient light 30 which reaches the black barrier 28 from either side thereof is blocked from further transmission thereat, and is in most part absorbed thereat. In this way, when the observer 18 views the screen 24 when turned off, for example, the screen itself appears black. And when the projector is operated for transmitting the image light through the serrations and out the screen 24, the black material 28 remains black for providing substantial black contrast for the image light as it varies in intensity at the corresponding pixels for projecting the resulting video image.

In the exemplary embodiment illustrated in FIG. 3, the serrations 26 are spaced laterally apart, and the black barrier 28 extends laterally therebetween for absorbing any light being transmitted between the opposing sides of adjacent serrations. In FIG. 3, the black barrier 28 is preferably flat between the serrations, and is substantially parallel to the panel second side 24.

The black barrier 28 illustrated in FIG. 3 is preferably a black coating disposed on the panel first side 22 between the adjoining serrations 26, which remain transparent without black coating for maintaining their ability to transmit light through the panel. The black barrier may also be disposed on the outlet screen 24 as described in alternate embodiments hereinbelow, but is preferably used on only one of the two opposite sides 22,24.

The black barrier may be formed of any suitable material composition which provides a black appearance, with maximum blackness being preferred. Ordinary black paint may be used as the barrier and may be simply spray painted over the selected portions of the panel using, for example, a common masking technique, or may be otherwise integrally formed therewith. In another embodiment, the entire inlet face 22 including the serrations thereon may be initially spray painted black, with the paint then being removed from the serrations 26 themselves by wiping clean the paint therefrom while still wet if practical.

Since the serrations 26 illustrated in FIG. 3 are specifically provided for redirecting the incident image light 16 from the acute incidence angle B to a direction substantially perpendicular to the outlet screen 24, they may be optimized for this function independently of the black material 28.

Correspondingly, since the black material 28 has the dedicated function of blocking and absorbing undesired light transmission for increasing screen contrast, its configuration may also be optimized independently of the serrations.

However, the relative surface area of the transparent serrations and black material may be adjusted for maximizing image resolution and brightness with a correspondingly high level of contrast attributable to the black material. Even a relatively small percentage of black material surface area can provide substantial contrast at the viewing screen 24 since the human brain integrates the image and perceives greater contrast or blackness due to the combined effect of variation of light intensity and available area of black matrix.

Figure 4:
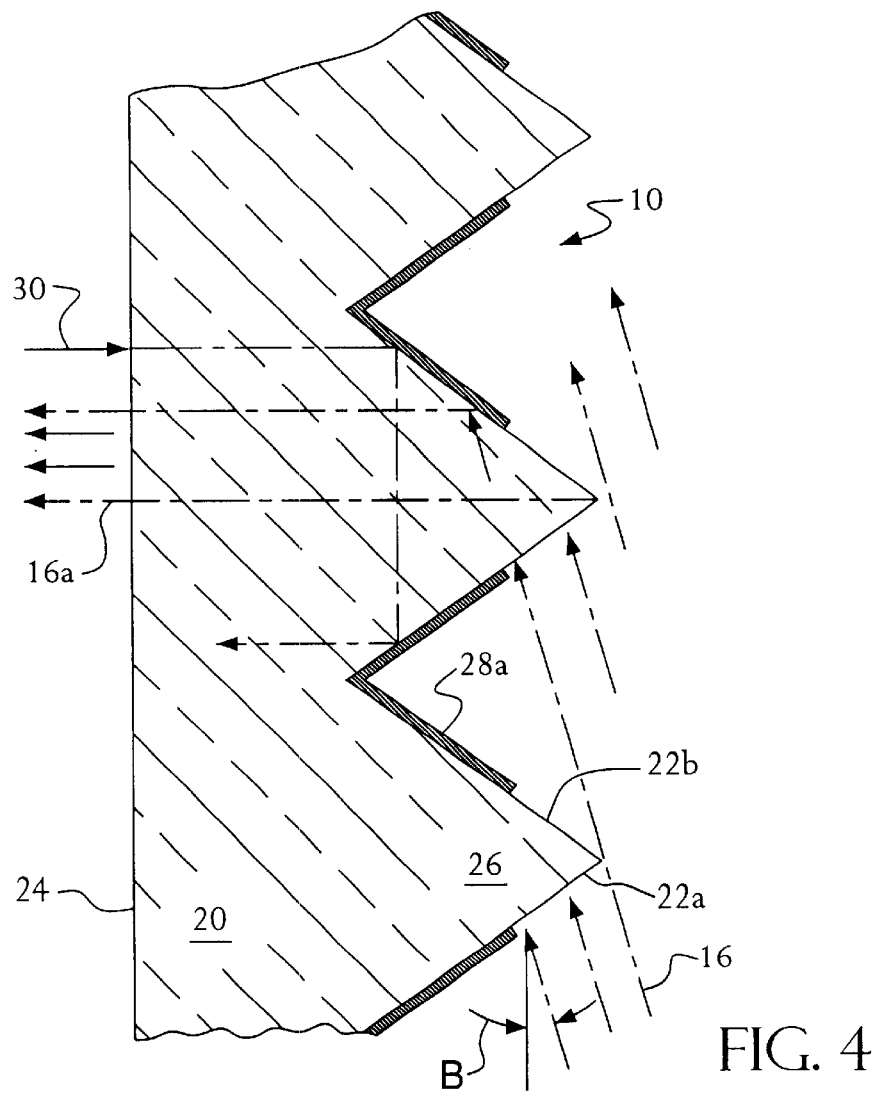
FIG. 4 is an enlarged sectional view of the panel illustrated in FIG. 1 having serrations defining a V-groove in accordance with an alternate embodiment of the present invention.

FIG. 4 illustrates an alternate embodiment of the black serrated optical panel in which the black barrier, designated 28a, is disposed obliquely to the panel second side 24. In this embodiment, the black barrier is coextensive with the first and second facets 22a,b of adjoining serrations 26, and defines a V-groove having an included groove angle which is preferably substantially equal to the apex angle of the triangular serrations 26.

In this embodiment, the serrations may be isosceles triangles which directly adjoin each other at their bases along the body film 20, and the black barrier 28a may be a simple black coating in the grooves or valleys defined between adjacent serration apexes. The black barrier terminates short of the apexes of the serrations to retain the transparent facets 22a,b for light reception into the panel.

The resulting black barrier 28a illustrated in FIG. 4 is both oblique to the outlet screen 24, as well as having cooperating portions defining the grooves which are oblique to each other on opposite sides of each of the serrations. In this way, ambient light 30 which enters the outlet screen 24 may first engage the black barrier along one side of the serration and be substantially absorbed thereat, with any remaining ambient light being internally reflected to the opposite black barrier on the same serration wherein it is further, or completely, absorbed. Substantially all ambient light entering the outlet screen may thusly be absorbed by multiple reflection for providing enhanced blackness or contrast over and above the contrast effected from the black barrier itself.

Furthermore, since the back or inlet side of the optical panel may be mounted inside in an enclosed cabinet which is preferably black, even the transparent facets 22a,b will also appear black due to the black space behind them.

The effective area of the black material may be maximized in conjunction with the minimum area required for the transparent facets 22a,b. As initially shown in FIG. 1, the projector 14 is mounted adjacent to the panel 10 either below, above, to either side, or even behind the panel for projecting the image light 16 substantially vertically, either directly from the projector or indirectly from suitable folding mirrors so that the image light illuminates the inlet face 22 at the acute incidence angle B illustrated in FIGS. 24. As shown in FIG. 4, the image light 16 is directed upwardly to illuminate the corresponding first facets 22a over the entire inlet side of the panel as required for re-directing the video image through the panel.

In the preferred embodiment illustrated in FIGS. 1–4, the serrations 26 preferably extend horizontally and continuously across the full width W of the optical panel, and the serrations are spaced vertically apart across the full height H of the panel.

As shown in FIG. 4, the second facets 22b are suitably inclined relative to the incidence angle of the image light for internally reflecting the image light through the body film and out through the panel second side or screen 24, and preferably substantially normal thereto.

Accordingly, the specific angular orientation of the two facets 22a,b is selected for each application as required for the specific incidence angle B of the image light for turning the light for projection out the screen 24 substantially normal thereto for maximizing brightness of the projected video image.

In the exemplary embodiment illustrated in FIG. 4, the black barrier 28a is disposed on the panel first side between all of the serrations 26, and within the shadow or projection effected by illuminating the first facets 22a. Since the image light 16 comes from a common projector source in the preferred embodiment, the light must be spread across all of the serrations of the full optical panel for generating corresponding pixels.

Since the angle of incidence B is acute and not normal to the inlet side of the panel, the individual serrations will cast shadows on the next adjacent serration thereabove. Accordingly, the projected image light cannot enter the inlet face in the shadow regions, and therefore the shadow regions may be utilized to advantage by including the black barrier over their entire extent. Correspondingly, each of the serrations 26 is transparent outwardly from the corresponding shadows for defining the two facets 22a,b.

The optical panel 10 illustrated in FIG. 4 may be formed of a commercially available turning film sold under the TRAF II trademark available from the 3M company of St. Paul, Minn. This acronym stands for Transmissive Right Angle Film which includes prismatic grooves defined between triangular prisms that may be used in an edge-lighted system for turning incident light therethrough. This film has a nominal thickness of about 155 microns, or about 6 mils, with prism angles of 71 degrees, and with a prism pitch of 50 microns.

Turning films are distinguishable from common lenticular screens, which merely focus light coincident therewith, but don't turn light obliquely therethrough. The turning film is non-lenticular, and effectively uses the black material for providing enhanced contrast as the image light is turned and projected therethrough.

Since the TRAF film is itself transparent and inherently provides no contrast capability, it may be modified in accordance with a preferred embodiment of the invention illustrated in FIG. 4 to include a black barrier material between the prisms, and in the grooves defined therebetween, while leaving exposed without black coating the tips of the prisms for defining the two facets 22a,b illustrated in FIG. 4.

In this embodiment, the prism serrations 26 are isosceles triangles and the first facets 22a thereof are disposed obliquely to the image light 16 from the projector for most incidence angles B.

Figure 5:
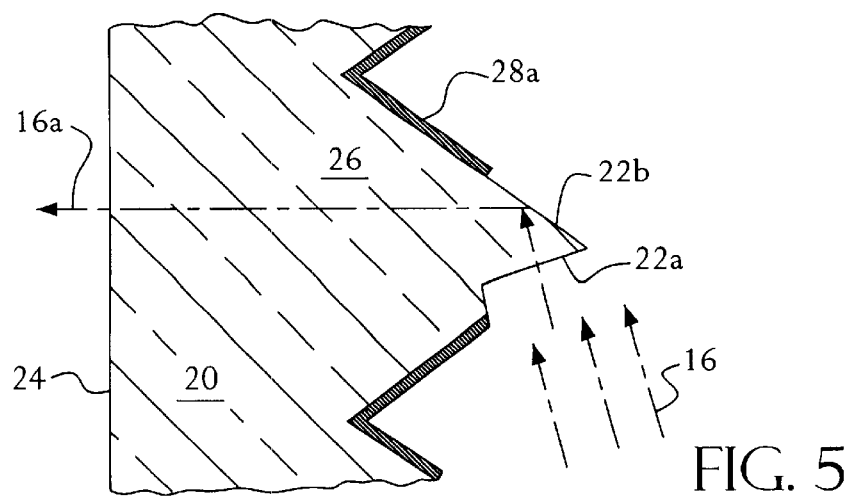
FIG. 5 is an enlarged sectional view of the panel illustrated in FIG. 1 having notched serrations in accordance with an alternate embodiment of the present invention.

FIG. 5 illustrates a further modification of the FIG. 4 embodiment wherein the first facets 22a may be notched into the serrations 26 for inclining the first facets relative to the adjacent black material 28a so that the first facets 22a are normal or perpendicular to the incident image light from the projector. This will increase the efficiency of light transmission into the serrations for redirection out the screen 24. The first facets 22a may alternatively be anti-reflection coated to increase transmission efficiency of the light entering the serration.

But for the notched first facet 22a, the individual serrations 26 remain isosceles triangles for maximizing the light absorbing capability of the black matrix 28a which permits multiple internal reflection and absorption of the ambient light incident to the screen 24 as described above with respect to FIG. 4.

In alternate embodiments, the relative angular orientations of the two facets defining the serrations 26 may be modified as desired for maximizing performance of the optical screen.

Figure 6:
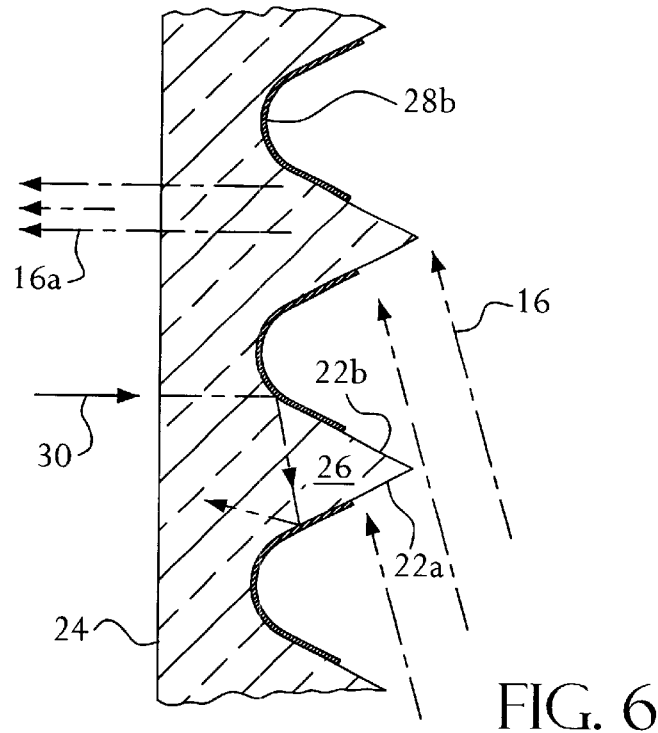
FIG. 6 is an enlarged sectional view of the panel illustrated in FIG. 1 having arcuate black barriers in accordance with an alternate embodiment of the present invention.

FIG. 6 illustrates yet another embodiment of the optical panel wherein the black barrier, designated 28b, may be arcuate between the prism serrations 26. The arcuate barrier is preferably concave for effectively absorbing ambient light 30 without obstructing the image light 16 incident on the inlet facets 22a. In yet another embodiment (not illustrated), the arcuate black barrier may be convex.

Since the black barrier illustrated in FIG. 6 is arcuate, the ambient light 30 received through the screen 24 is still absorbed in most part upon first contact with the black barrier, and prior to being internally reflected at various angles depending upon where on the arcuate barrier the ambient light is received. Nevertheless, any residual ambient light reflected off the black barrier is either additionally absorbed when directed at laterally opposing portions of the black material, or is otherwise dispersed at different angles for increasing the apparent blackness or contrast of the screen.

Figure 7:
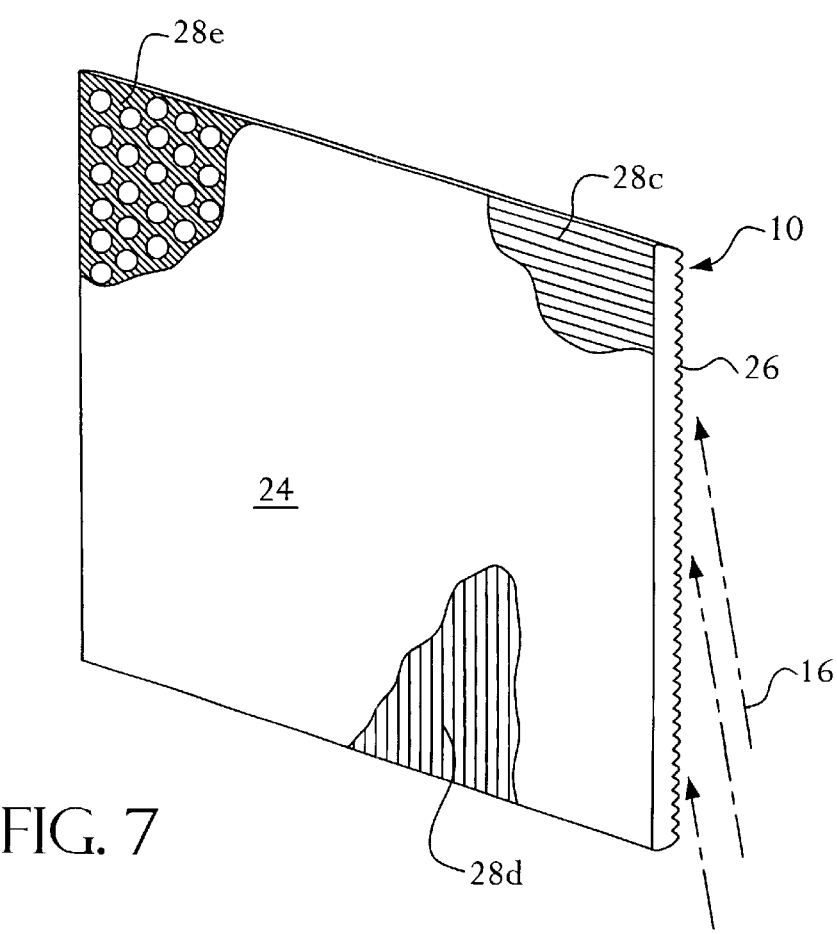
FIG. 7 is a schematic view of an optical display panel illustrating a black material matrix as per three additional embodiments of the present invention.

Although the black material provided in the various embodiments of FIGS. 1–6 is preferably disposed on the inlet first side 22 of the optical panel, FIG. 7 illustrates schematically three additional embodiments wherein the black barrier is disposed on the panel second side or outlet screen 24 instead of the serrated first side 22 of the panel.

In these exemplary embodiments, the black barrier, designated 28c,d,e, defines corresponding matrices of alternating black and transparent elements. The black barrier may be provided by a simple black coating in selected regions of the screen, with the transparent elements being defined by corresponding portions of the screen which are not coated with the black barrier. The relative area of the black and transparent elements of the screen are chosen so that a suitable video image may be projected through the transparent elements, with the black elements providing a spatially intermittent black matrix for providing enhanced contrast.

In one embodiment, the black matrix 28c includes parallel black stripe elements being parallel with the serrations 26 over the full width of the screen, and spaced apart along the height of the screen. In this way, the image light 16 received by the serrations 26 is turned and transmitted through the optical panel for projection out the transparent stripe portions of the screen laterally between the black stripe matrix elements, which provide contrast therefor.

Alternatively, FIG. 7 illustrates another embodiment wherein the black matrix 28d includes parallel black stripe elements which are disposed transverse or perpendicular to the serrations 26 and run in length along the height of the optical panel, and spaced apart along the panel width. The image light 16 is again turned through the serrations 26 for projection from the screen 24 between the transparent stripe elements between the horizontally spaced apart black stripe elements which provide contrast therefor.

If desired, the horizontal black matrix 28c may be combined with the vertical black matrix 28d for creating a checkerboard pattern or grid of alternating or intermittent regions of black barrier and transparent sections of the screen. The pixels are defined by the transparent elements of the grid, whereas the black elements of the grid provide contrast therefor.

An exemplary form of the black grid matrix 28e is also shown in FIG. 7. The grid matrix includes transparent spots in a uniform checkerboard grid pattern within a corresponding black matrix background. The transparent spots may be circular as illustrated, or square, or rectangular or other suitable shape, with a corresponding shape for the remaining black matrix.

These three different embodiments of the black matrix on the outlet screen 24 are illustrated in the single optical panel in FIG. 7 for clarity of presentation since it is contemplated that only one form of the black matrix would be used over the entire screen 24. However, different forms of black matrix may be used for different portions of the screen as shown, if desired, in further alternate embodiments.

Since the black matrix embodiments illustrated in FIG. 7 are disposed on the outlet screen 24 itself, they provide contrast or blackness for the screen which is limited by the blackness of the matrix itself. In the preferred embodiment of the black matrix illustrated in FIGS. 2–6, the black coating is provided on the inlet side 22 of the panel which permits ambient light from the screen side 24 of the panel to reflect inside the panel itself for multiple reflections in which the ambient light is correspondingly absorbed for increasing the apparent blackness and contrast perceived by the observer.

The optical panel described above in various embodiments is surprisingly simple in configuration since it may be formed from a single continuous sheet of optically transparent film of extremely thin size of about 6 mils for example. The screen side 24 of the film is plain and relatively smooth and may be frosted as desired for diffusing image light in dispersing the video image. The serrated inlet side 22 of the panel may be configured with suitable light-turning prisms for receiving the image light from a suitable projector at a shallow incidence angle. The panel may thusly be illuminated along a single edge thereof for reducing the overall thickness of the panel in combination with the image projector. Thusly, only the panel itself is required for displaying the video image separately created by the video projector.

Substantial contrast is introduced into the otherwise transparent panel by incorporating the black material therein in the various embodiments disclosed above. Since the black material represents a grid of black barrier intermittently spaced from transparent or non-black elements, the black material may be formed using any conventional grid forming technique. In a simple embodiment, the transparent elements may be initially masked, with the remainder of the optical panel being painted black for producing the matrix, followed in turn by removing the protection mask.

The singular element optical panel accordingly has the capability for sharply turning the incident image light up to about 90 degrees and simultaneously displaying the video image on its outlet screen without the need for additional panel layers. The image itself is separately created in the projector using a LCD, or DMD, or other suitable light modulation device. The projector may be relatively small, and, the video image created therein may initially be correspondingly small or compressed and may be preferably expanded as desired using suitable imaging optics for projection over the entire optical panel.

Accordingly, the optical panel itself may be as small as or as large as desired, with the video image projected thereon being controlled by the cooperating projector.

The optical panel thusly enjoys substantial advantages in simplicity of construction and enhanced optical performance over known forms of large panel displays including CRTs, projection TVs, and LCDs.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

For example, instead of providing the black grid matrix 28e (i.e. composed of the horizontal black matrix 28c and vertical black matrix 28d) entirely on the panel second side or outlet screen 24, either the horizontal black matrix 28c or the vertical black matrix 28d may be provided on the inlet first side 22 while the other black matrix element is provided on the outlet screen 24. For example, the horizontal black matrix 28c may be formed on the outlet screen 24 while the vertical black matrix 28d is formed on the inlet first side 22. Alternatively, the vertical black matrix 28d may be formed on the outlet screen 24 while the horizontal black matrix 28c is formed on the inlet first side 22. With either of these constructions, the combination of the two separate black matrix elements would function similarly to the black grid matrix 28e formed on only the outlet screen 24.

In another example, instead of providing the transparent serrations 26 in the form of prisms extending horizontally from one edge of the inlet first side 22 to the other edge, the serrations may be provided vertically from the top of the inlet first side 22 to the bottom. Alternatively, instead of providing the transparent serrations in the form of elongated prisms (either extending horizontally or vertically), the serrations may be provided in pyramidal shapes with the base of each serration being square or rectangle shaped when viewing the panel from the inlet first side 22.

Accordingly, what is desired to be secured by Letters Patent of the United States is the invention as defined and differentiated in the following claims in which I claim:

1. An optical display panel comprising:
    a first side having transparent serrations, each serration having an apex;
    an opposite second side; and
    a black barrier positioned on the serrations between said apexes for absorbing light;
    wherein each of said serrations includes a transparent first facet for channeling light therethrough, and an opposite second facet adjoining said first facet at said apex for effecting total internal reflection of said channeled light between said first facet and said second side.

2. A panel according to claim 1, wherein each of said serrations comprises a triangular prism, with said first and second facets defining opposite sides of said prism, said first and second facets intersecting at said apex having an included apex angle therebetween.

3. A panel according to claim 1, wherein said serrations are positioned laterally from each other, and said black barrier extends laterally therebetween for absorbing light.

4. A panel according to claim 3, wherein said black barrier is flat between said serrations, and substantially parallel to said panel second side, wherein said black barrier is disposed between opposing first and second facets of adjoining serrations for absorbing light.

5. A panel according to claim 3, wherein said serrations are adjacent one another, said black barrier is coextensive with first and second facets of adjoining serrations.

6. A panel according to claim 5, wherein said black barrier defines a groove having an included groove angle.

7. A panel according to claim 6, wherein said first and second facets intersect at said apex having an included apex angle therebetween, and wherein said included groove angle is substantially equal to said apex angle.

8. A panel according to claim 6, wherein said black barrier includes first and second groove sides defining said groove, each groove side being oblique to said panel second side, and wherein ambient light which enters said panel through said second side is totally or partially blocked or absorbed at the first groove side with any remaining ambient light being reflected towards the second groove side of a black barrier of an adjacent serration where the remaining ambient light is further blocked or absorbed.

9. A panel according to claim 5, wherein said black barrier is arcuate between said first and second facets of adjoining serrations.

10. A panel according to claim 5, wherein said black barrier is concave between said first and second facets of adjoining serrations.

11. A panel according to claim 1, wherein said black barrier comprises paint.

12. A panel according to claim 1, wherein said black barrier comprises a black coating.

13. A panel according to claim 1, wherein another black barrier is provided on said panel second side.

14. A panel according to claim 13, wherein said black barrier and said another black barrier, in combination, define a black matrix when viewing said panel through the panel second side.

15. A panel according to claim 13, wherein said black barrier on said first side includes elements which are parallel with said serrations on said first side, and wherein said another black barrier on said second side includes elements which are perpendicular with said serrations on said first side.

16. A panel according to claim 13, wherein said black barrier on said first side includes elements which are perpendicular with said serrations on said first side, and wherein said another black barrier on said second side includes elements which are parallel with said serrations on said first side.

17. A panel according to claim 1, wherein said first facets are notched.

18. A panel according to claim 17, wherein said notched portions of said first facets are perpendicular to received image light.

19. A panel according to claim 1, wherein said serrations extend horizontally across a width of said panel, and are positioned vertically from each other across a height of said panel.

20. A panel according to claim 1 further comprising a diffusing member provided at said panel second side.

21. A panel according to claim 1, wherein said panel second side is frosted.

22. An optical display panel system comprising:
   an optical panel comprising:
      a first side having transparent serrations, each serration having an apex;
      an opposite second side; and
      a black barrier positioned on the serrations between said apexes for absorbing light;
   wherein each of said serrations includes a transparent first facet and an opposite second facet adjoining said first facet at said apex; and
   a projection system for projecting image light, said projection system comprising:
      a projector for projecting said image light at an acute incidence angle to said panel first side for illuminating said first facets, wherein said image light is transmitted through said first facets, and wherein said second facets are inclined to effect total internal reflection of said image light to thereby direct said image light through said panel second side substantially normal thereto.

23. A panel system according to claim 22, wherein said black barrier is disposed on said panel first side between said apexes within a shadow effected by illuminating said first facet of an adjacent serration, with said serrations being transparent outwardly from said black barrier towards said apexes.

24. A panel system according to claim 22, wherein said first facets are oblique to said image light from said projector.

25. A panel system according to claim 22, wherein said first facets are perpendicular to said image light from said projector.

26. A panel system according to claim 22, wherein said first facets are notched.

27. A panel system according to claim 25, wherein the notched portions of said first facets are perpendicular to said image light from said projector.

28. A panel system according to claim 22, further comprising a diffusing member provided at said panel second side.

29. A panel system according to claim 22, wherein said panel second side is frosted.

30. A panel system according to claim 22, wherein said serrations extend horizontally across a width of said panel, and are positioned vertically from each other across a height of said panel.

31. An optical display panel comprising an inlet face having transparent serrations, an opposite outlet screen, wherein each of said serrations includes a transparent first facet for channeling light therethrough, and an opposite second facet adjoining said first facet at an apex, said second facet effecting total internal reflection of said channeled light between said first facet and said opposite outlet screen which displays the light, said panel further comprising a black material positioned on the serrations and aligned between apexes of said serrations for absorbing light therebetween while permitting light transmission through said apexes.

32. A panel according to claim 31, wherein said black material is disposed on said inlet face laterally between said transparent serrations for absorbing light therebetween.

33. A panel according to claim 32, wherein said black material is flat between said serrations, and substantially parallel to said outlet screen, wherein said black material is disposed between opposing first and second facets of adjoining serrations for absorbing light.

34. A panel according to claim 31, wherein said transparent serrations are positioned across a width of said panel, and are laterally spaced apart across a height of said panel.

35. A panel according to claim 31, wherein:
   said serrations are adjacent one another, each of said serrations comprises a triangular prism, with said first and second facets defining opposite sides thereof intersecting at said apex having an included apex angle therebetween; and
   said black material is coextensive with said first and second facets of adjoining serrations, wherein said black material defines a groove.

36. A panel according to claim 35, wherein said groove has an included groove angle.

37. A panel according to claim 36, wherein said included groove angle is substantially equal to said apex angle.

38. A panel according to claim 36, wherein said black material includes first and second groove sides defining said groove, each groove side being oblique to said outlet screen, and wherein ambient light which enters said panel through said outlet screen is totally or partially blocked or absorbed at the first groove side with any remaining ambient light being reflected towards the second groove side of a black material of an adjacent serration where the remaining ambient light is further blocked or absorbed.

39. A panel according to claim 35, wherein said groove is arcuate.

40. A panel according to claim 35, wherein said groove is concave.

41. A panel according to claim 31, wherein said first facets are notched.

42. A panel according to claim 41, wherein said notched portions of said first facets are perpendicular to said light.

43. A panel according to claim 31, wherein said black material is provided as a grid.

44. A panel according to claim 31 further comprising a diffusing member provided at said outlet screen.

45. A panel according to claim 31, wherein said outlet screen is frosted.

46. An optical display panel comprising a black inlet face having transparent serrations projecting therefrom for receiving and effecting total internal reflection of image light, wherein each of said serrations comprises first and second facets intersecting at an apex, wherein said black inlet face includes a black barrier disposed between said apexes for absorbing light therebetween, wherein the panel further comprises an opposite outlet screen for displaying said image light with increased contrast due to the light absorption at said black inlet face.

47. A panel according to claim 46 further comprising a diffusing member provided at said outlet screen.

48. A panel according to claim 46, wherein said outlet screen is frosted.

49. A panel according to claim 46 wherein the first and second facets define a triangular prism.

* * * * *

UNITED STATES PATENT AND TRADEMARK OFFICE
CERTIFICATE OF CORRECTION

PATENT NO. : 6,597,417 B1
DATED : July 22, 2003
INVENTOR(S) : Veligdan

It is certified that error appears in the above-identified patent and that said Letters Patent is hereby corrected as shown below:

Column 11,
Line 47, delete "25" and insert therefor -- 26 --.

Signed and Sealed this

Sixteenth Day of December, 2003

JAMES E. ROGAN
*Director of the United States Patent and Trademark Office*